(12) United States Patent
Wang et al.

(10) Patent No.: US 12,299,899 B2
(45) Date of Patent: May 13, 2025

(54) SYSTEMS AND METHODS FOR REAL-TIME STATE ESTIMATION OF FAST-MOVING OBJECTS

(71) Applicants: SAMSUNG ELECTRONICS CO., LTD., Suwon-si (KR); The Trustees of the University of Pennsylvania, Philadelphia, PA (US)

(72) Inventors: Ziyun Wang, Mountain View, CA (US); Fernando Cladera Ojeda, Philadelphia, PA (US); Anthony Robert Bisulco, New York, NY (US); Dae Won Lee, Princeton, NJ (US); Camillo J. Taylor, Mountain View, CA (US); Konstantinos Daniilidis, Wynnewood, PA (US); Ani Hsieh, Marlton, NJ (US); Ibrahim Volkan Isler, Saint Paul, MN (US)

(73) Assignees: SAMSUNG ELECTRONICS CO., LTD., Suwon-si (KR); The Trustees of the University of Pennsylvania, Philadelphia, PA (US)

( * ) Notice: Subject to any disclaimer, the term of this patent is extended or adjusted under 35 U.S.C. 154(b) by 379 days.

(21) Appl. No.: 17/978,873

(22) Filed: Nov. 1, 2022

(65) Prior Publication Data
US 2023/0136306 A1 May 4, 2023

Related U.S. Application Data

(60) Provisional application No. 63/274,739, filed on Nov. 2, 2021.

(51) Int. Cl.
*G06T 7/20* (2017.01)
*A63B 65/12* (2006.01)
(Continued)

(52) U.S. Cl.
CPC ............... *G06T 7/20* (2013.01); *A63B 65/12* (2013.01); *G06V 10/82* (2022.01); *G06V 20/44* (2022.01); *G06T 2207/30241* (2013.01)

(58) Field of Classification Search
CPC ............ G06T 2207/30241; G06T 7/20; G06T 2207/20076; G06T 2207/30224;
(Continued)

(56) References Cited

U.S. PATENT DOCUMENTS

2020/0410342 A1* 12/2020 Willers .................. G06N 20/20
2022/0138466 A1*  5/2022 Bisulco ................. G06V 10/82
                                                           348/142

OTHER PUBLICATIONS

Iacono, Massimiliano, et al. "Towards event-driven object detection with off-the-shelf deep learning." 2018 IEEE/RSJ International Conference on Intelligent Robots and Systems (IROS). IEEE, 2018. (Year: 2018).*

(Continued)

*Primary Examiner* — Gandhi Thirugnanam
*Assistant Examiner* — Connor L Hansen
(74) *Attorney, Agent, or Firm* — Sughrue Mion, PLLC

(57) ABSTRACT

Provided is a method for predicting a location of a fast-moving object. The method includes receiving event information from an event camera, the event information corresponding to an event detected by the event camera, generating a Binary Event History Image (BEHI) based on the event information, providing the BEHI as an input to an event-based neural network, obtaining, as an output of the event-based neural network, a first predicted location of the fast-moving object, a normal distribution indicating prediction uncertainty of the predicted location, and a predicted time-to-collision (TTC). The method further includes estimating a second predicted location of the fast-moving object based on the first predicted location, the normal distribution, and the predicted TTC output by the event-based neural (Continued)

network, and actuating a mechanical catching device to be at the second predicted location.

20 Claims, 4 Drawing Sheets

(51) Int. Cl.
*G06V 10/82* (2022.01)
*G06V 20/40* (2022.01)

(58) Field of Classification Search
CPC ........ G06V 20/44; G06V 40/20; G06V 20/42; G06V 2201/07; G06V 10/82; A63B 65/12
See application file for complete search history.

(56) References Cited

OTHER PUBLICATIONS

Monforte, Marco. "Trajectory Prediction with Event-Based Cameras for Robotics Applications." (2021). (Year: 2021).*

Joe, Hyun-Min, Joonwoo Lee, and Jun-Ho Oh. "Dynamic nonprehensile manipulation of a moving object using a batting primitive." Applied Sciences 11.9 (2021): 3920. (Year: 2021).*

Bisulco, Anthony, et al. "Fast Motion Understanding with Spatiotemporal Neural Networks and Dynamic Vision Sensors." arXiv preprint arXiv:2011.09427 (2020). (Year: 2020).*

* cited by examiner

SYSTEMS AND METHODS FOR REAL-TIME STATE ESTIMATION OF FAST-MOVING OBJECTS

CROSS-REFERENCE TO RELATED APPLICATION(S)

This application claims priority to U.S. Provisional Application No. 63/274,739, filed on Nov. 2, 2021, in the U.S. Patent and Trademark Office, the disclosure of which being incorporated by reference herein in its entirety.

BACKGROUND

1. Field

The disclosure related to a method for predicting a trajectory of a fast-moving object, and more particularly to systems and methods for real-time state estimation of fast-moving objects.

2. Description of Related Art

Biological systems are able to estimate and catch objects moving at very fast speeds. For example, professional table tennis players can hit table tennis balls at speeds greater than 25 m/s, and Major League Baseball catchers can catch fast balls flying toward them at a speed of 40 m/s. On the other hand, state-of-the-art robots can only catch objects at lower speeds using vision-based sensors. This performance difference can be mainly explained by the limitation of robot perception using frame-based cameras: with high-speed motion, traditional cameras can only receive a few frames within the flight time of the object. A naive approach would be to increase the frame rate of the camera. However, there is an inherent trade-off between frame rate, bandwidth, and latency. Increasing the frame rate and resolution of the sensor would lead to a larger volume of data to process, and thus incur longer latencies that are detrimental to the performance of the catching system. The trade-off between high latency and high computational cost for traditional cameras is a critical obstacle on the path to achieving human-level catching performance.

Many of these problems can be avoided by using bioinspired event cameras, which are designed to emulate biological vision to enable fast perception. Their high-temporal sampling resolution, low bandwidth, high dynamic range, and asynchronous capabilities make them ideal sensors for dynamic environments.

Event cameras have been previously shown in perception systems for dodging and avoidance of dynamic obstacles, but have not been able to catch fast balls shot towards the camera, which is a harder task as it requires both precision and speed. Since actuators have mechanical limitations, the time allocated for perception is bounded. These circumstances impose significant constraints on the latency of the perception system. Additionally, the deadline to make a control decision depends on the velocity and size of the incoming object.

There have been multiple attempts to develop robots capable of catching a fast ball by predicting its trajectory. Despite these previous attempts, the presented systems are usually too slow for real-time catching of balls returned by a real human. The related work in this area either 1) target low-speed motion, 2) require an external motion capture system, or 3) rely on high-bandwidth and intensive computation. In contrast, the systems and methods according to the present disclosure provide for intercepting balls at higher speeds, using low-bandwidth event representations, capable of running in resource-constrained systems.

SUMMARY

In accordance with an aspect of the disclosure, a method for predicting a location of a fast-moving object, the method includes: receiving event information from an event camera, the event information corresponding to an event detected by the event camera; generating a Binary Event History Image (BEHI) based on the event information; providing the BEHI as an input to an event-based neural network; in response to inputting the BEHI, obtaining, as an output of the event-based neural network, a first predicted location of the fast-moving object, a normal distribution indicating prediction uncertainty of the predicted location, and a predicted time-to-collision (TTC); estimating a second predicted location of the fast-moving object based on the first predicted location, the normal distribution, and the predicted TTC output by the event-based neural network; and actuating a mechanical catching device to be at the second predicted location.

The method may further include: receiving a plurality of event information corresponding to a plurality of events detected by the event camera, the event information for each event including a horizontal position of the event in a camera frame of the event camera, a vertical position of the event in the camera frame of the event camera, a timestamp of the event, and a polarity of the event.

The method may further include: obtaining a list of events including at least two events from the plurality of events detected by the event camera; and generating the BEHI based on the horizontal position, vertical position, and timestamp associated with each event in the list of events.

In an embodiment, the BEHI projects the fast-moving object onto an image plane where only pixels that are changed during a time-range of the list of events are activated to highlight a trajectory of the fast-moving object, the time-range corresponding to a time between an earliest event and a latest event in the list of events.

The method may further include: obtaining a plurality of event lists based on the plurality of events detected by the event camera, each event list including at least two events from the plurality of events; and generating a plurality of BEHI, each BEHI corresponding to an event list among the plurality of event lists, where each BEHI among the plurality of BEHI has a same number of channels independent of a time-range of each list of events.

In an embodiment, the plurality of BEHI are provided as an input to the event-based neural network, and the output of the event-based neural network is based on the plurality of BEHI.

In an embodiment, the event-based neural network includes a regression network having five convolution layers with batch normalization and one fully connected layer having 370,947 parameters.

The method may further include: generating high-frequency ground truth data by splitting a known trajectory and known target position of a fast-moving object into a plurality of sequences, each sequence corresponding to an independent ground truth in the high-frequency ground truth data; and training the event-based neural network using the generated high-frequency ground truth data.

The method may further include: actuating the mechanical catching device within 150 milliseconds to intercept the fast-moving object at the second predicted location.

In an embodiment, the fast-moving object is moving with an average speed of 13 meters per second.

In accordance with an aspect of the disclosure, a system for predicting a location of a fast-moving object includes: an event camera; an event-based neural network; a catching device; a memory storing instructions; and a processor. The processor may be configured to execute the instructions to: receive event information from the event camera, the event information corresponding to events detected by the event camera; generate a Binary Event History Image (BEHI) based on the event information; provide the BEHI as an input to the event-based neural network; in response to inputting the BEHI, obtain, as an output of the event-based neural network, a first predicted location of the fast-moving object, a normal distribution indicating prediction uncertainty of the predicted location, and a predicted time-to-collision (TTC); estimate a second predicted location of the fast-moving object based on the first predicted location, the normal distribution, and the predicted TTC output by the event-based neural network; and actuate the mechanical catching device to be at the second predicted location.

The processor may be further configured to execute the instructions to: obtain a list of events from a plurality of events detected by the event camera; and generate the BEHI based on a horizontal position, vertical position, and timestamp associated with each event in the list of events.

In an embodiment, the BEHI projects the fast-moving object onto an image plane where only pixels that are changed during a time-range of the list of events are activated to highlight a trajectory of the fast-moving object, the time-range corresponding to a time between an earliest event and a latest event in the list of events.

The processor may be further configured to execute the instructions to: obtain a plurality of lists of events from the plurality of events detected by the event camera; and generate a plurality of BEHI, each BEHI corresponding to a list of events from the plurality of lists of events, where each BEHI among the plurality of BEHI has a same number of channels independent of a time-range of each list of events.

In an embodiment, the plurality of BEHI are provided as an input to the event-based neural network, and the output of the event-based neural network is based on the plurality of BEHI.

In accordance with an aspect of the disclosure, there is provided a non-transitory computer readable medium for storing computer readable program code or instructions which are executable by a processor to perform operations for predicting a location of a fast-moving object. The operations include: receiving event information from an event camera, the event information corresponding to events detected by the event camera; generating a Binary Event History Image (BEHI) based on the event information; providing the BEHI as an input to an event-based neural network; obtaining, as an output of the event-based neural network in response to inputting the BEHI, a first predicted location of the fast-moving object, a normal distribution indicating prediction uncertainty of the predicted location, and a predicted time-to-collision (TTC); estimating a second predicted location of the fast-moving object based on the first predicted location, the normal distribution, and the predicted TTC output by the event-based neural network; and actuating a mechanical catching device to be at the second predicted location.

The operations may further include: obtaining a list of events from a plurality of events detected by the event camera; and generating the BEHI based on a horizontal position, vertical position, and timestamp associated with each event in the list of events.

In an embodiment, the BEHI projects the fast-moving object onto an image plane where only pixels that are changed during a time-range of the list of events are activated to highlight a trajectory of the fast-moving object, the time-range corresponding to a time between an earliest event and a latest event in the list of events.

The operations may further include: obtaining a plurality of lists of events from the plurality of events detected by the event camera; and generating a plurality of BEHI, each BEHI corresponding to a list of events from the plurality of lists of events, where each BEHI among the plurality of BEHI has a same number of channels independent of a time-range of each list of events.

In an embodiment, the plurality of BEHI are provided as an input to the event-based neural network, and the output of the event-based neural network is based on the plurality of BEHI.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
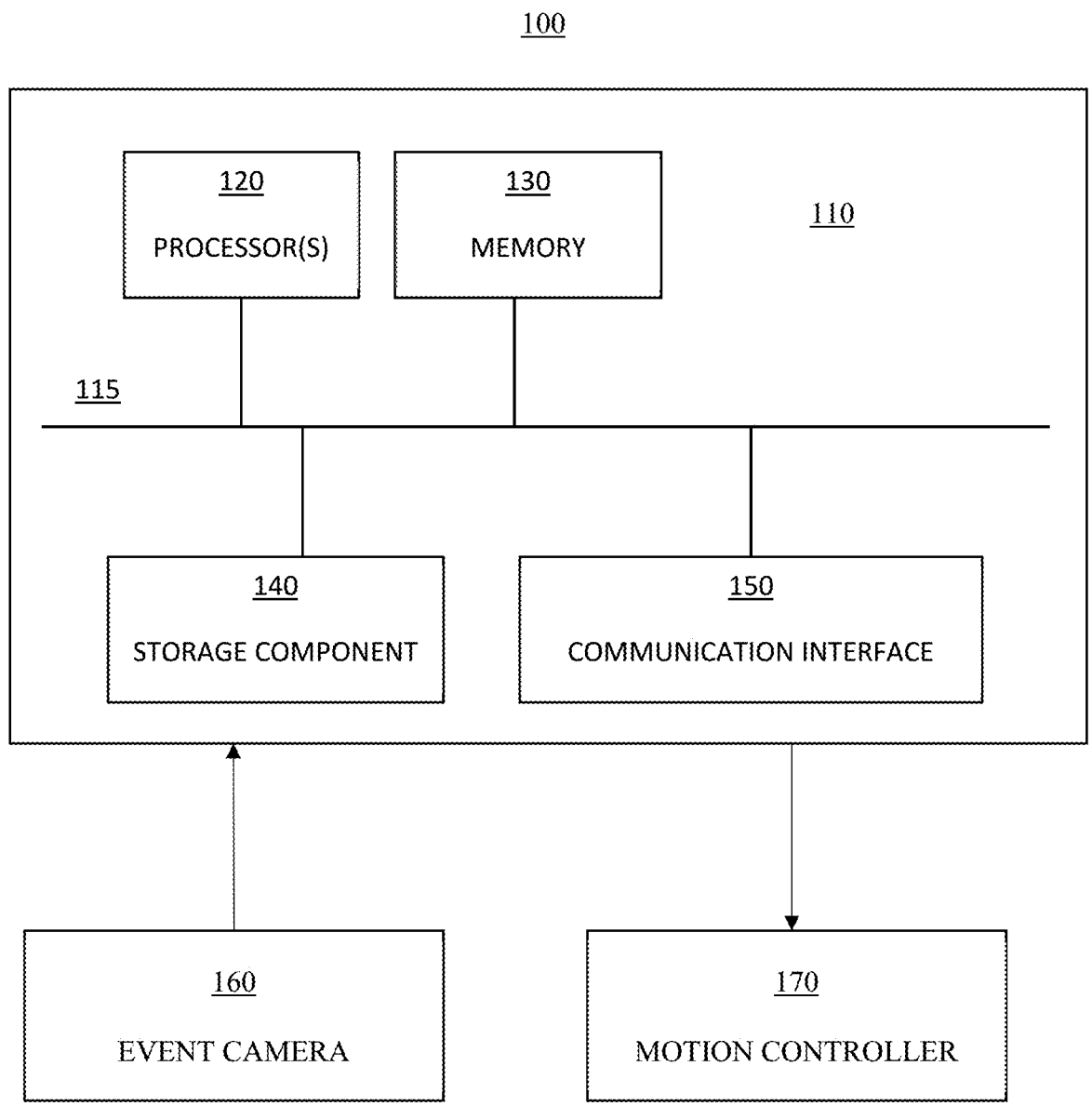
FIG. 1 is a diagram illustrating a system for catching a fast-moving object, according to an embodiment.

Aspects of the disclosure relate to event-based perception-action, and more specifically, to systems and methods capable of performing inference in real-time of a target position of a fast-moving object and issuing an appropriate motion command to intercept the object. For example, according to various embodiments, there is provided a system and method capable of catching an object moving at a speed of up to 13 meters per second by performing an inference of the object's target position and issuing a motion command to a linear rail to intercept the object at the inferred location. According to various embodiments, there is provided a novel, lightweight representation for events which can accurately encode event history. The lightweight representation for events significantly reduces the computational cost of real-time event representation processing. According to various embodiments, there is provided a compact and fast event-based neural network and a robust motion estimation algorithm. According to various embodiments, there is provided an end-to-end system for catching a fast-moving object.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flow diagrams and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

FIG. 1 is a diagram illustrating a system for catching a fast-moving object, according to an embodiment. Referring to FIG. 1, the system 100 may include a device 110, an event camera 160, and a motion controller 170.

The device 110 may include a bus 115, one or more processor(s) 120, a memory 130, a storage component 140, and a communication interface 150. It is understood that one or more of the components may be omitted and/or one or more additional components may be included.

The bus 115 includes a component that permits communication among the components of the device 110. The processor 120 may be implemented in hardware, firmware, or a combination of hardware and software. The processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a sparse tensor core, or another type of processing component. The processor 120 may include one or more processors. For example, the processor 120 may include one or more CPU, APU, FPGA, ASIC, sparse tensor core, or another type of processing component. The one or more processors of the processor 120 may be capable of being programmed to perform a function.

The memory 130 includes a random access memory (RAM), a read only memory (ROM), and/or another type of dynamic or static storage device (e.g., a flash memory, a magnetic memory, and/or an optical memory) that stores information and/or instructions for use by the processor 120.

The storage component 140 stores information and/or software related to the operation and use of the device 110. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. According to an embodiment, the storage component 140 may include a high-speed storage (e.g., Flash-based memory).

The communication interface 150 includes a transceiver-like component (e.g., a transceiver and/or a separate receiver and transmitter) that enables the device 110 to communicate with other devices, such as via a wired connection, a wireless connection, or a combination of wired and wireless connections. The communication interface 150 may permit the device 110 to receive information from another device (e.g., event camera 160) and/or provide information to another device (e.g., motion controller 170). For example, the communication interface 150 may include an Ethernet interface, an optical interface, a coaxial interface, an infrared interface, a radio frequency (RF) interface, a universal serial bus (USB) interface, a Wi-Fi interface, a cellular network interface, or the like. According to an embodiment, a communication interface between the device 110 and the motion controller 170 may be hardwired to reduce latency.

The device 110 may perform one or more processes or functions described herein. The device 110 may perform operations based on the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 150. When executed, software instructions stored in the memory 130 and/or storage component 140 may cause the processor 120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, device 110 may include additional components, fewer components, different components, or differently arranged components than those shown in FIG. 1. Additionally, or alternatively, a set of components (e.g., one or more components) of device 110 may perform one or more functions described as being performed by another set of components of device 110.

The event camera 160 may include an event-based sensor (also known as a dynamic vision sensor) that measures asynchronous changes in log-light intensity. The event camera 160 may output event information as a set of events E={$e_1, e_2, \ldots, e_n$}, where for each event $e_i$={$x_i,y_i,p_i,t_i$}, the coordinates ($x_i,y_i$) correspond to a camera pixel location, $p_i$ corresponds to a polarity (sign change of the log-light intensity), and $t_i$ corresponds to a time at which a light change occurs. The event camera 160 may provide the output to the device 110.

The motion controller 170 may receive data indicating a target position of an object, and generate one or more commands to control a motion of a mechanical device (e.g., a linear actuator) based on the target position. For example, the motion controller 170 may receive data including a set of coordinates indicating the target position from the device 110, and the motion controller 170 may generate and send one or more commands to control a motion of the mechanical device so that a catching component of the mechanical device moves to intercept, or catch, an object at the target position.

Any one of the operations or processes described below (e.g., FIG. 2-4) may be implemented by or using any one of the elements illustrated in FIG. 1.

Figure 2:
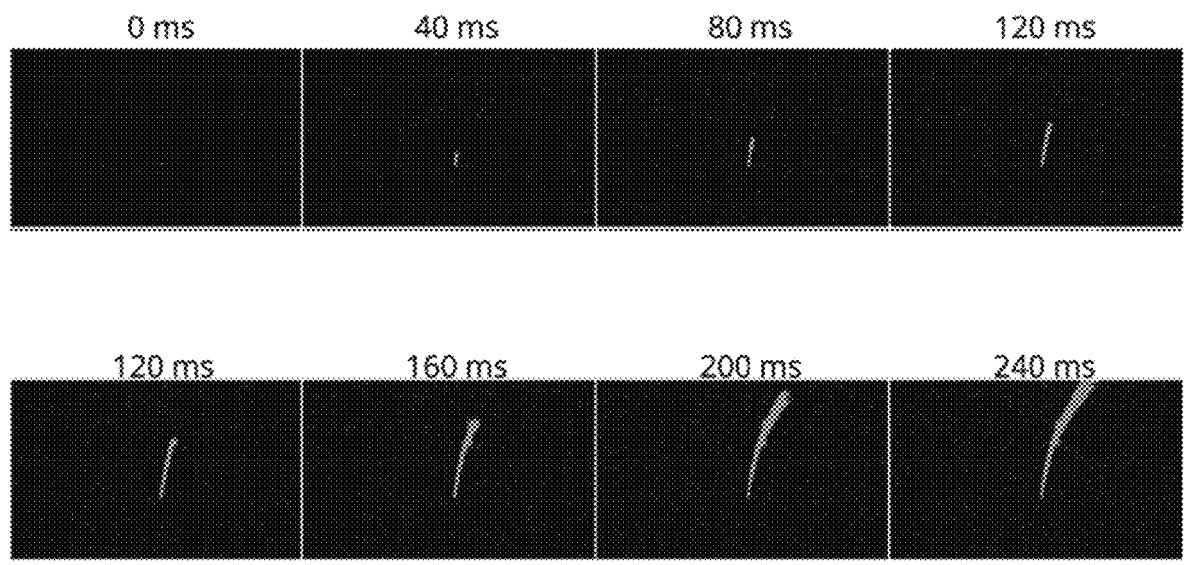
FIG. 2 is an illustration of a Binary Event History Image (BEHI) based on event information, according to an embodiment.

FIG. 2 is an illustration of a Binary Event History Image (BEHI) based on event information, according to an embodiment. A BEHI is a lightweight representation of event information (e.g., from event camera 160). For a list of events {$e_1, e_2, \ldots, e_N$}, a BEHI at time T may be defined as:

$$I_T(x, y) = \left(\sum_{i=1}^{N}[x_i = x, y_i = y, t_i < T]\right) > 0. \quad (1)$$

Referring to FIG. 2, a BEHI at time T=0 ms, 40 ms, 80 ms, 120 ms, 160 ms, 200 ms, and 240 ms are shown, to illustrate a progression of an object moving towards an event camera. Each BEHI shows only pixels that have changed. That is, a BEHI at time T shows only pixels that have changed from an initial time (e.g., 0 ms) until the time T. In this way, the BEHI highlights a trajectory of the object. Additionally, each BEHI includes the same number of channels independently of the total time range of the events. Compared to grayscale images whose history requires heavy concatenation, a BEHI keeps a constant-sized image that preserves the trajectory information. For an event camera with an event-based sensor of resolution W×H the size required for BEHI is only (W×H) bits.

Figure 3:
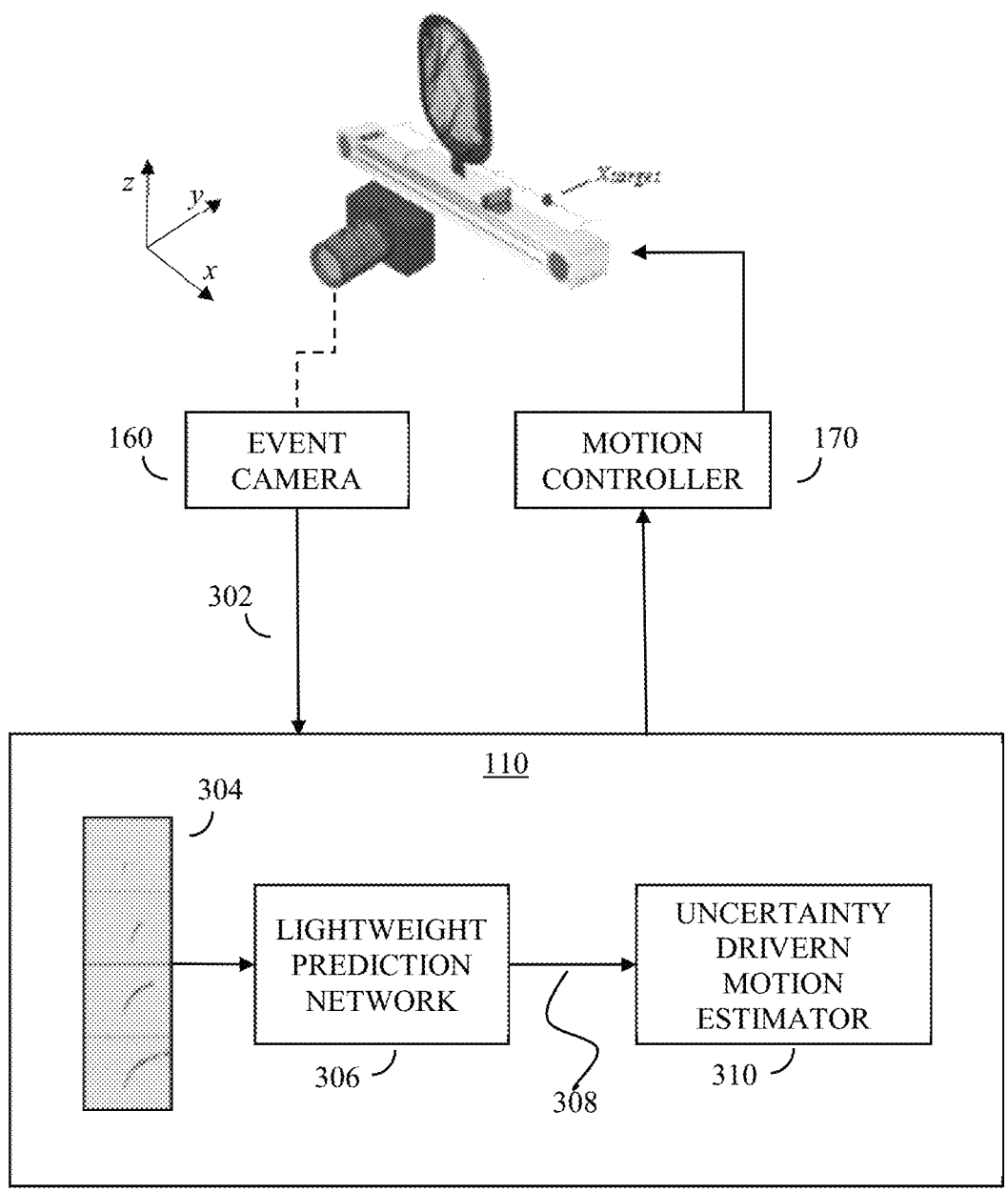
FIG. 3 is a diagram illustrating a data flow in a system for catching a fast-moving object, according to an embodiment.

FIG. 3 is a diagram illustrating a data flow in a system for catching a fast-moving object, according to an embodiment. Referring to FIG. 3, the event camera 160 may measures asynchronous changes in log-light intensity in an environment. The event camera 160 may generate event information for each detected event in the environment. For example, when the event camera 160 measures a first light change, the event camera 160 may generate first event information $e_1$ and send the first event information to the device 110. When the event camera 160 measures a second light change, the event camera 160 may generate second event information $e_2$, and send the second event information to the device 110. When the event camera 160 measures an N-th light change, the even camera 160 may generate N-th event information $e_N$, and send the N-th event information to the device 110. The event camera 160 may continuously monitor the environment to generate event information for each measured light change and provide the event information to the device 110 as event stream 301.

The device 110 may receive the event stream 302 and store the event information in the event stream 302 as a list of events {$e_1, e_2, \ldots, e_N$} (e.g., in memory 130 and/or storage component 140). The device 110 may generate a plurality of BEHIs 304 based on the list of events, and input the plurality of BEHIs 304 into a lightweight prediction network 306. The lightweight prediction network 306 may include a machine-learned neural network model that receives the plurality of BEHIs 304 as an input, and outputs prediction information 308 based on the plurality of BEHIs 304. The prediction information 308 output by the lightweight prediction model 306 may include a predicted location of an object, an uncertainty associated with the predicted location of the object, and a predicted time-to-collision (TTC), based on the plurality of BEHIs 304. The predicted TTC may indicate a predicted time when the object's position will overlap with an image plane corresponding to the event camera 160. For example, the TTC may indicate a predicted time when a forward most (in a direction towards the event camera 160) part of the object will intersect with the image plane corresponding to the event camera 160.

When the device 110 receives early event data on an incoming object (e.g., event information at a time close to T=0 ms, when the incoming object is farther away from the image plane of the event camera 160), a size of the object observed by the event camera 160 will be smaller, and a number of pixels highlighting a trajectory of the object in the BEHIs 304 will be relatively few, thereby increasing an uncertainty in a predicted location output by the lightweight prediction network 306. As the object moves closer to the event camera 160, a motion of the object becomes more apparent. However, when the object is a fast-moving object, there may be only a limited number of data points (e.g., event information corresponding to detected events/measured light change) before the system 100 must perform a catch maneuver. Therefore, even if the early event data contains a certain amount of noise, it may be beneficial to use the early event data to estimate a target position of the object. To mitigate the effect of the noise in the early event data, the system 100 may use a confidence based approach to estimate the target position by a weighted least-squares regression. To this effect, the lightweight prediction network 306 may be trained to output a normal distribution $N(d_i, \sigma_i)$ as an uncertainty associated with a predicted location $d_i$ in a world frame of the object, where $\sigma_i$ corresponds to a standard deviation of the distribution inversely correlated with confidence. The lightweight prediction network 306 may be trained using an explicit motion model on a three-dimensional (3D) trajectory that generates a plurality of ground truths based on the one 3D trajectory. For example, a 3D trajectory spanning S seconds may be split into $N_s$ trajectories each spanning $$\frac{S}{N_s}$$

seconds. In this way, the lightweight prediction network 306 may be trained on higher frequency ground truth data.

According to an embodiment, the device 110 may resize the BEHIs 304 before inputting the BEHIs 304 to the lightweight prediction network 306. For example, each BEHI 304 may be resized to 250×250 before being input to the lightweight prediction network 306. By resizing the BEHIs 304 before inputting to the lightweight prediction network 306, a latency of the system 100 may be reduced.

According to an embodiment, the lightweight prediction network 306 may include 4 convolutional layers (with batch normalization) and 1 linear layer, with a total of 370,947 parameters. Each convolutional layer may include 64 channels with 3×3 kernels. A stride size of 2 may be used to decrease the resolution. Average pooling may be used to spatially aggregate features before the linear layer. Rectified Linear Units (ReLU) may be used after each BatchNorm layer as activation functions. This design allows running inference in batches of 12 within 20 ms, and the trained network demonstrates competitive performance in learning motions. The lightweight prediction network 306 may be trained for 100 epochs with a learning rate of $2 \cdot 10^{-4}$ and a batch size of 16.

According to an embodiment, for an output position d and ground truth object location $\hat{d}_i$, the regression loss forces the network to predict the mean of the predicted normal distribution:

$$L_{L1}^{POS}(d, \hat{d}) = \frac{1}{n}\sum_{i=1}^{n}|d_i - \hat{d}_i|. \quad (2)$$

According to an embodiment, for an output time $TTC_i$, an L1 regression loss is used to supervise the TTC prediction from the current event time stamp, which is defined as the timestamp of the last event in the current BEHI:

$$L_{L1}^{TIME}(ttc, \hat{ttc}) = \frac{1}{n}\sum_{i=1}^{n}|ttc_i - \hat{ttc}_i|. \quad (3)$$

According to an embodiment, for an output position $d_i$, standard deviation $\sigma_i$ from the network and the ground truth object $\hat{d}_i$, a negative log-likelihood loss can be computed as:

$$L_{NLL}(d, \sigma, \hat{d}) = -\frac{1}{n}\sum_{i=1}^{n}\log\left(\frac{1}{\sigma_i\sqrt{2\pi}}\exp\left(-\frac{1}{2}\left(\frac{d_i - \hat{d}_i}{\sigma_i}\right)^2\right)\right) \quad (4)$$

$$= \frac{1}{2n}\sum_{i=1}^{n}\log(\sigma_i) + \left(\frac{d_i - \hat{d}_i}{\sigma_i}\right)^2 + cst. \quad (5)$$

According to an embodiment, for training the lightweight prediction network 306 a loss may be jointly optimized by taking a weighted sum of functions (2), (3), and (5). The term in $L_{NLL}$ makes the network unstable if the initial mean estimate $d_i$ is inaccurate. An object location may be learned alone with the negative log likelihood loss term. However, the convergence of the log-likelihood function depends on a good initial mean estimate and is vulnerable to outliers. Therefore, the L1 regression loss is used to help stabilize network training, with λ value of 0.1.

$$L = L_{L1}^{POS} + L_{L1}^{TIME} + \lambda \cdot L_{NLL} \quad (6)$$

According to an embodiment, the output 308 of the lightweight prediction network 306 may include a list of noisy object position predictions $x_i$ and standard deviation $\sigma_i^2$, predicted TTC $TTC_i$. The output 308 may be provided to the uncertainty-driven motion estimator 310 (referred to as motion estimator 310). Based on the list of noisy object position predictions $x_i$ and standard deviation $\sigma_i^2$, predicted TTC $TTC_i$, and corresponding event frame timestamps $t_i$, the target position $x_{target}$ may be recovered. To reduce computation cost, a linear trajectory model may be used:

$$X = T\beta + \epsilon, T = \begin{bmatrix} 1 & t_1 \\ \cdots \\ 1 & t_N \end{bmatrix} \quad (7)$$

where ε is normally distributed and the observations are independent, resulting in an inverse covariance matrix.

$$\Sigma = \begin{pmatrix} \frac{1}{\sigma_1} & \cdots & 0 \\ \vdots & \ddots & \vdots \\ 0 & \cdots & \frac{1}{\sigma_n} \end{pmatrix} \quad (8)$$

The weighted least squares based on position predictions X and the inverse variance matrix Σ can be written as:

$$\beta = (X^T\Sigma X)^{-1}X^T\Sigma T, \quad (9)$$

The prediction of the time to collision may be determined based on the mean of the projected impact time predictions:

$$\bar{t} = \frac{1}{N}\sum_{i=1}^{N}(t_i + ttc_i) \quad (10)$$

where $\bar{t}$ is with respect to $t_1$, which is the timestamp of the first event image. To get the target position $x_{target}$, the TTC is input into the weighted regression model in Equation 7:

$$x_{target} = [1 \bar{t}]\beta. \quad (11)$$

According to an embodiment, a linear model is used in the x-direction under the assumption that the object motion is ballistic, with gravity aligned with the z axis. In various embodiments, the linear model may be modified to include more complicated motions, such as aerodynamic effects on the x axis.

Figure 4:
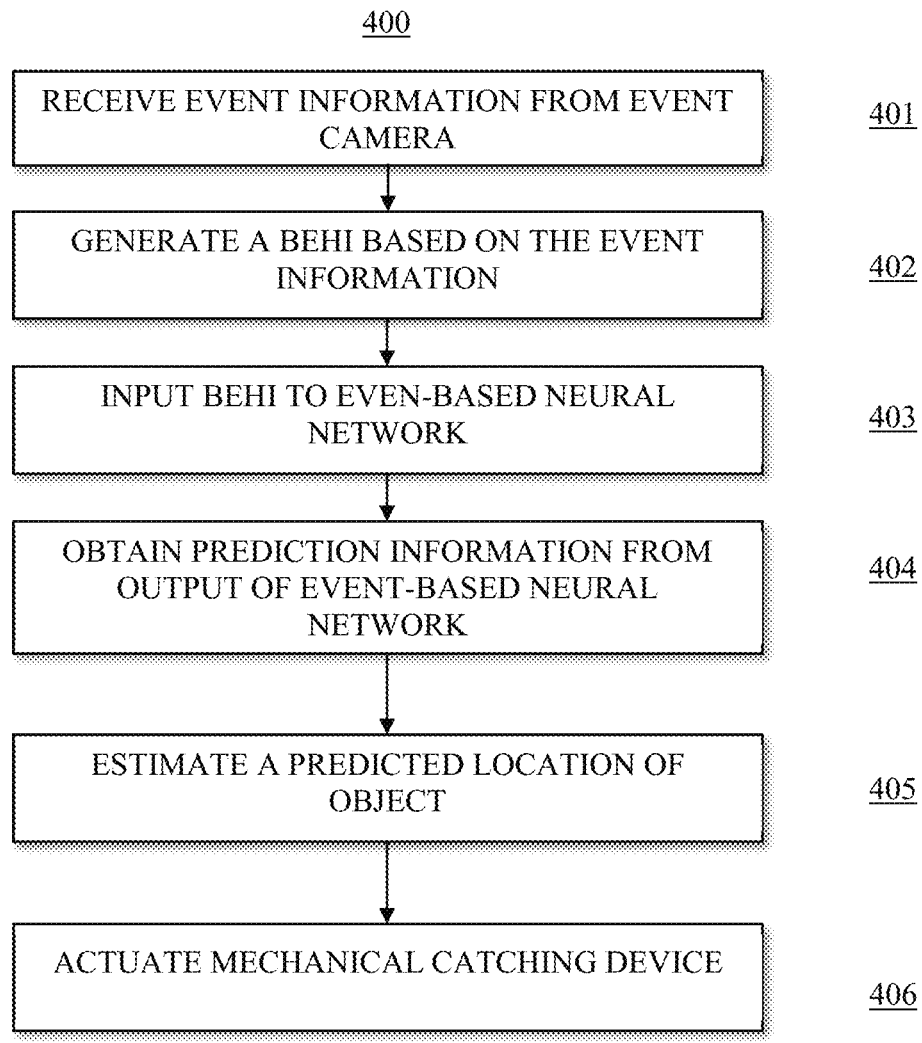
FIG. 4 is a diagram illustrating a method for predicting a location of a fast-moving object, according to an embodiment.

FIG. 4 is a diagram illustrating a method for predicting a location of a fast-moving object, according to an embodiment. Referring to FIG. 4, at 401, the method 400 includes receiving event information from an event camera. For example, the device 110 may receive the event stream 302 including event information from the event camera 160. The event information may correspond to events detected by the event camera 160. A moving object in an environment monitored by the event camera 160 will cause the event camera 160 to detect events associated with the object, and the event camera 160 may generate event information for each detected event. The event information for each event detected by the event camera 160 may include a horizontal position of the event within a frame of the event camera 160, a vertical position of the event within the frame of the event camera 160, a timestamp of the event, and a polarity of the event. According to an embodiment, the fast-moving object may be moving with an average speed of 13 meters per second.

At 402, the method 400 includes generating a BEHI based on the event information. For example, the device 110 may generate a BEHI among the plurality of BEHIs 304 based on event information in the event stream 302. The device 110 may obtain a list of events from the plurality of events detected by the event camera 160, and generate a BEHI for an event based on the horizontal position, vertical position, and timestamp associated with each event in the list of events. The BEHI projects the fast-moving object onto an image plane where only pixels that are changed during a time-range of the list of events are activated to highlight a trajectory of the fast-moving object, the time-range corresponding to a time between an earliest event and a latest event in the list of events. According to an embodiment, the device 110 may obtain a plurality of lists of events from the plurality of events detected by the event camera 160, and generate the plurality of BEHI 304, each BEHI corresponding to a list of events from the plurality of lists of events. Each BEHI among the plurality of BEHI 304 may include a same number of channels independent of a time-range of each list of events At 403, the method 400 includes providing the BEHI as an input to an event-based neural network. For example, the device 110 may input a BEHI among the plurality of BEHIs 304 to the lightweight prediction network 306. According to an embodiment, the device 100 may input the plurality of BEHI 304 to the lightweight prediction network 160, and the output of the lightweight prediction network 160 may be based on the plurality of BEHI 304. The lightweight prediction network 160 may include a regression network having five convolution layers with batch normalization and one fully connected layer having 370,947 parameters.

According to an embodiment, the lightweight prediction network 160 may be trained by generating high-frequency ground truth data by splitting a known trajectory and known target position of a fast-moving object into a plurality of sequences, each sequence corresponding to an independent ground truth in the high-frequency ground truth data At 404, the method 400 includes obtaining prediction information as an output of the event-based neural network. For example, in response to inputting the plurality of BEHIs 304, the device 110 may obtain, as an output of the lightweight prediction network 306, prediction information 308. The prediction information 308 may include a first predicted location of the fast-moving object, a normal distribution indicating prediction uncertainty of the predicted location, and a predicted TTC.

At 405, the method 400 includes estimating a second predicted location of the fast-moving object based on the prediction information. For example, the device 110 may estimate a target position of the fast-moving object based on the prediction information 308 including the first predicted location of the fast-moving object, a normal distribution indicating prediction uncertainty of the predicted location, and a predicted TTC.

At 406, the method 400 includes actuating a mechanical catching device to be at the second predicted location. For example, the device 110 may provide the estimated target position to the motion controller 170. According to an embodiment, the motion controller 170 may generate and send one or more commands to a mechanical device with a catching component (mechanical catching device) causing the mechanical device to intercept the fast-moving object at the estimated target position. The mechanical catching device may be actuated within 150 milliseconds to intercept the fast-moving object at the estimated target position. According to an embodiment, the motion controller 170 may generate and send one or more commands to a mechanical device to avoid the object at the estimated target position.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and interpreted programming languages, such as Python, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flow diagram and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow and block diagrams in the Figures illustrate the architecture, functionality, and operation of possible implementations of systems, methods, and computer readable media according to various embodiments. In this regard, each block in the flow diagram or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for predicting a location of a fast-moving object, the method comprising:
    receiving event information from an event camera, the event information corresponding to an event detected by the event camera;
    generating a Binary Event History Image (BEHI) based on the event information;
    providing the BEHI as an input to an event-based neural network;
    in response to inputting the BEHI, obtaining, as an output of the event-based neural network, a first predicted location of the fast-moving object, a normal distribution indicating prediction uncertainty of the predicted location, and a predicted time-to-collision (TTC);
    estimating a second predicted location of the fast-moving object based on the first predicted location, the normal distribution, and the predicted TTC output by the event-based neural network; and
    actuating a mechanical catching device to be at the second predicted location.

2. The method of claim 1, wherein the receiving the event information from the event camera further comprises:
    receiving a plurality of event information corresponding to a plurality of events detected by the event camera, the event information for each event including a horizontal position of the event in a camera frame of the event camera, a vertical position of the event in the camera frame of the event camera, a timestamp of the event, and a polarity of the event.

3. The method of claim 2, wherein generating the BEHI based on the plurality of event information comprises:
    obtaining a list of events including at least two events from the plurality of events detected by the event camera; and
    generating the BEHI based on the horizontal position, vertical position, and timestamp associated with each event in the list of events.

4. The method of claim 3, wherein the BEHI projects the fast-moving object onto an image plane where only pixels that are changed during a time-range of the list of events are activated to highlight a trajectory of the fast-moving object, the time-range corresponding to a time between an earliest event and a latest event in the list of events.

5. The method of claim 3, further comprising:
    obtaining a plurality of event lists based on the plurality of events detected by the event camera, each event list including at least two events from the plurality of events; and
    generating a plurality of BEHI, each BEHI corresponding to an event list among the plurality of event lists, wherein each BEHI among the plurality of BEHI has a same number of channels independent of a time-range of each list of events.

6. The method of claim 5, wherein the plurality of BEHI are provided as an input to the event-based neural network, and the output of the event-based neural network is based on the plurality of BEHI.

7. The method of claim 1, wherein the event-based neural network comprises a regression network having five convolution layers with batch normalization and one fully connected layer having 370,947 parameters.

8. The method of claim 1, further comprising:
generating high-frequency ground truth data by splitting a known trajectory and known target position of a fast-moving object into a plurality of sequences, each sequence corresponding to an independent ground truth in the high-frequency ground truth data; and
training the event-based neural network using the generated high-frequency ground truth data.

9. The method of claim 1, wherein actuating the mechanical catching device to be at the second predicted location comprises:
actuating the mechanical catching device within 150 milliseconds to intercept the fast-moving object at the second predicted location.

10. The method of claim 1, wherein the fast-moving object is moving with an average speed of 13 meters per second.

11. A system for predicting a location of a fast-moving object, the system comprising:
an event camera;
an event-based neural network;
a catching device;
a memory storing instructions; and
a processor configured to execute the instructions to:
receive event information from the event camera, the event information corresponding to events detected by the event camera;
generate a Binary Event History Image (BEHI) based on the event information;
provide the BEHI as an input to the event-based neural network;
in response to inputting the BEHI, obtain, as an output of the event-based neural network, a first predicted location of the fast-moving object, a normal distribution indicating prediction uncertainty of the predicted location, and a predicted time-to-collision (TTC);
estimate a second predicted location of the fast-moving object based on the first predicted location, the normal distribution, and the predicted TTC output by the event-based neural network; and
actuate the mechanical catching device to be at the second predicted location.

12. The system of claim 11, wherein the processor is further configured to execute the instructions to:
obtain a list of events from a plurality of events detected by the event camera; and
generate the BEHI based on a horizontal position, vertical position, and timestamp associated with each event in the list of events.

13. The system of claim 12, wherein the BEHI projects the fast-moving object onto an image plane where only pixels that are changed during a time-range of the list of events are activated to highlight a trajectory of the fast-moving object, the time-range corresponding to a time between an earliest event and a latest event in the list of events.

14. The system of claim 13, wherein the processor is further configured to execute the instructions to:
obtain a plurality of lists of events from the plurality of events detected by the event camera; and
generate a plurality of BEHI, each BEHI corresponding to a list of events from the plurality of lists of events, wherein each BEHI among the plurality of BEHI has a same number of channels independent of a time-range of each list of events.

15. The system of claim 14, wherein the plurality of BEHI are provided as an input to the event-based neural network, and the output of the event-based neural network is based on the plurality of BEHI.

16. A non-transitory computer readable medium for storing computer readable program code or instructions which are executable by a processor to perform operations for predicting a location of a fast-moving object, the operations comprising:
receiving event information from an event camera, the event information corresponding to events detected by the event camera;
generating a Binary Event History Image (BEHI) based on the event information;
providing the BEHI as an input to an event-based neural network;
obtaining, as an output of the event-based neural network in response to inputting the BEHI, a first predicted location of the fast-moving object, a normal distribution indicating prediction uncertainty of the predicted location, and a predicted time-to-collision (TTC);
estimating a second predicted location of the fast-moving object based on the first predicted location, the normal distribution, and the predicted TTC output by the event-based neural network; and
actuating a mechanical catching device to be at the second predicted location.

17. The non-transitory computer readable medium of claim 16, wherein the operations further comprise:
obtaining a list of events from a plurality of events detected by the event camera; and
generating the BEHI based on a horizontal position, vertical position, and timestamp associated with each event in the list of events.

18. The non-transitory computer readable medium of claim 17, wherein the BEHI projects the fast-moving object onto an image plane where only pixels that are changed during a time-range of the list of events are activated to highlight a trajectory of the fast-moving object, the time-range corresponding to a time between an earliest event and a latest event in the list of events.

19. The non-transitory computer readable medium of claim 18, wherein the operations further comprise:
obtaining a plurality of lists of events from the plurality of events detected by the event camera; and
generating a plurality of BEHI, each BEHI corresponding to a list of events from the plurality of lists of events, wherein each BEHI among the plurality of BEHI has a same number of channels independent of a time-range of each list of events.

20. The non-transitory computer readable medium of claim 19, wherein the plurality of BEHI are provided as an input to the event-based neural network, and the output of the event-based neural network is based on the plurality of BEHI.

* * * * *